(12) United States Patent  (10) Patent No.: US 8,532,587 B2
Lagnado et al.  (45) Date of Patent: Sep. 10, 2013

(54) USAGE MODE-BASED ANTENNA SELECTION

(75) Inventors: Isaac Lagnado, Houston, TX (US); Timothy Neill, Houston, TX (US); Ravindra P. Malalasekera, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1362 days.

(21) Appl. No.: 11/144,467

(22) Filed: Jun. 3, 2005

(65) Prior Publication Data

US 2006/0276221 A1   Dec. 7, 2006

(51) Int. Cl.
*H04M 1/72*  (2006.01)
*H04M 1/725*  (2006.01)
*H04W 52/42*  (2009.01)
*H04B 7/06*  (2006.01)

(52) U.S. Cl.
CPC ...... *H04M 1/72519* (2013.01); *H04M 1/72583* (2013.01); *H04M 1/72522* (2013.01); *H04W 52/42* (2013.01); *H04B 7/0617* (2013.01)
USPC .......................................... 455/101; 455/566

(58) Field of Classification Search
USPC ............... 455/101, 556.2, 575.7, 562.1, 269, 455/272, 344, 73, 426.2, 74.1, 351, 68, 277.1, 455/67.11, 556, 405, 186.2
See application file for complete search history.

(56) References Cited

U.S. PATENT DOCUMENTS

| | | | |
|---|---|---|---|
| 5,794,145 A * | 8/1998 | Milam ........................ | 455/426.1 |
| 6,370,369 B1 | 4/2002 | Kraiem et al. | |
| 6,445,688 B1 | 9/2002 | Garces et al. | |
| 6,531,985 B1 | 3/2003 | Jones et al. | |
| 6,862,433 B2 | 3/2005 | Callaway, Jr. | |
| 6,980,782 B1 * | 12/2005 | Braun et al. ............... | 455/277.2 |
| 7,010,313 B2 * | 3/2006 | Vilmur et al. ................ | 455/513 |
| 7,043,209 B2 * | 5/2006 | Hirota ........................... | 455/101 |
| 2003/0197648 A1 * | 10/2003 | Quinn et al. .................. | 343/702 |
| 2004/0041734 A1 * | 3/2004 | Shiotsu et al. ................ | 343/702 |
| 2004/0061662 A1 * | 4/2004 | Yoshihara et al. ............ | 345/1.1 |
| 2004/0204175 A1 * | 10/2004 | Karaoguz et al. ............ | 455/572 |
| 2005/0091431 A1 * | 4/2005 | Olodort et al. ................. | 710/72 |
| 2005/0093753 A1 * | 5/2005 | Masaki ......................... | 343/702 |
| 2005/0146470 A1 * | 7/2005 | Li et al. ........................ | 343/702 |
| 2005/0245292 A1 * | 11/2005 | Bennett et al. ............... | 455/574 |
| 2006/0030265 A1 * | 2/2006 | Desai et al. .................. | 455/41.2 |
| 2006/0164799 A1 * | 7/2006 | Varela .......................... | 361/680 |
| 2007/0188380 A1 * | 8/2007 | Duong et al. ................. | 342/374 |

FOREIGN PATENT DOCUMENTS

| | | |
|---|---|---|
| CN | 1123476 | 5/1996 |
| CN | 1326241 A | 12/2001 |
| CN | 1400513 | 5/2003 |

(Continued)

OTHER PUBLICATIONS

Office Action dated May 20, 2008, Japanese App. No. 2006-149586, 4 p.

(Continued)

*Primary Examiner* — Melody Mehrpour

(57) ABSTRACT

Embodiments of devices and methods employ usage mode based antenna selection. One disclosed method embodiment comprises determining a usage mode of a device, and selecting a subset of the available antennas in the device. The subset that is selected corresponds to the usage mode.

19 Claims, 3 Drawing Sheets

(56) References Cited

FOREIGN PATENT DOCUMENTS

| | | |
|---|---|---|
| JP | 61-053842 | 3/1986 |
| JP | 61200702 | 9/1986 |
| JP | 02-246530 | 2/1990 |
| JP | 2000341017 | 12/2000 |
| JP | 200150999 T | 7/2001 |
| JP | 2001326514 | 11/2001 |
| JP | 2002-076737 | 3/2002 |
| JP | 2002076737 | 3/2002 |
| JP | 2003101623 | 4/2003 |
| JP | 2003163956 | 6/2003 |
| JP | 2003258522 | 9/2003 |
| JP | 2003283393 | 10/2003 |
| JP | 2004-120654 | 4/2004 |
| JP | 2004140815 | 5/2004 |
| JP | 2004241887 | 8/2004 |
| JP | 2004274633 | 9/2004 |
| JP | 2005006091 | 1/2005 |
| JP | 2005130216 | 5/2005 |
| JP | 2005-303856 | 10/2005 |
| JP | 2005303856 | 10/2005 |
| WO | WO-2005013586 | 2/2005 |

OTHER PUBLICATIONS

Translation of Japanese Office Action, Appln No. P2006-149586, date of dispatch Sep. 9, 2008, pp. 2.
China Office Action, Dated Feb. 12, 2010, 6 pages.
Japanese Office Action, Appln No. P2008-310753, date of dispatch Dec. 7, 2010, pp. 2.
Translation of Japanese Office Action. Appln No. P2008-310753, date of dispatch Dec. 7, 2010, pp. 3.
CN Office Action dated Aug. 3, 2010, pp. 5.

\* cited by examiner

USAGE MODE-BASED ANTENNA SELECTION

BACKGROUND

There has long been an interest in equipping computers with wireless communications capability, but only recently has such capability been viewed as a necessity. The proliferation of powerful, portable electronic devices has created a commensurate need for facilitating communication between these devices. Existing interface cables have proven to be cumbersome and limiting. Accordingly, system designers now provide a wireless communications capability for most modern portable electronic devices.

Five major types of (portable) wireless communications capability exist today: infrared ports, wireless personal area networks (WPANs), wireless local area networks (WLANs), cellular or wireless wide area networks (WWANs), and satellite. Devices equipped with infrared ports communicate through the use of infrared signals, while devices using the other four major types of wireless communications communicate through the use of radio frequency (RF) signals. Infrared signals are easily blocked, and the typical communications range is very limited (e.g., about 5 meters). WPANs generally use very low power RF signals, which typically limits the communications range to approximately 10 meters or so. (Their target application is cable replacement.) WLANs are wireless alternatives to wire-based local area networks (LANs), and their range is approximately 100 meters. The communications range of cellular devices is substantially greater (about 20 kilometers), and they rely on a network of cellular base stations to communicate anywhere the telecommunications network will reach. Similarly, satellite phones can access a base station several thousand kilometers away via a network of earth-orbiting satellites, and communicate anywhere the telecommunications network will reach.

In wireless communications, the energy transmitted to a receiving device falls off rapidly as the distance from the transmitting device increases. The environment around the transmitting and receiving devices comprises various objects that cause reflection and attenuation. One proven method for addressing such problems is antenna diversity. When a receiving device is provided with an array of antennas, the receiving device can combine signals from the various antennas in such a manner as to "focus" the array on the transmitting device in some cases, or in other cases, to simply enhance sensitivity in certain directions while suppressing sensitivity in other directions. The directional characteristics of antenna arrays allow for improved signal reception and more reliable wireless communications.

Unfortunately, several obstacles exist to incorporating antenna diversity techniques in portable devices. Such devices may be usable in a variety of orientations, causing the antenna array's orientation to be altered undesirably. The relative position of the device's user may change, thereby affecting the reception of one or more antennas in the array. The portable device's physical size is typically minimized, limiting the antenna spacing. Finally, the portable device may have limited resources, limiting processing power and speed for adapting the antenna array's configuration.

SUMMARY

Accordingly there is disclosed herein devices and methods employing usage mode-based antenna selection. In some embodiments, methods comprise determining a usage mode of a device, and selecting a subset of the available antennas in the device. The subset that is selected corresponds to the usage mode.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be illustrative of that embodiment, and not intended to suggest that the scope of the disclosure or the claims is limited to that embodiment.

Figure 1:
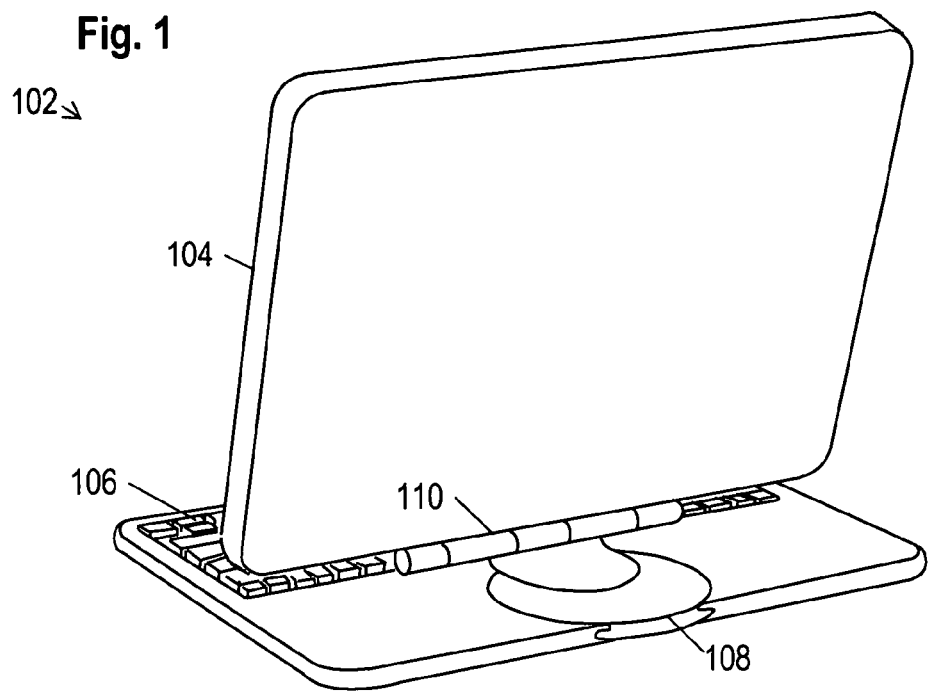
FIG. 1 shows an illustrative tablet computer in a keyboard configuration.

FIG. 1 shows an illustrative computer 102 (e.g., a tablet portable computer) deployed in a keyboard configuration. In this configuration, a monitor 104 is tilted vertically with respect to a keyboard 106, and a user can interact with the computer in much the same manner as a laptop. In other words, the user views information on monitor 104 and enters commands or other information via the keyboard 106 and/or via a pointing device integrated with keyboard 106 or externally attached to keyboard 106.

Figure 2:
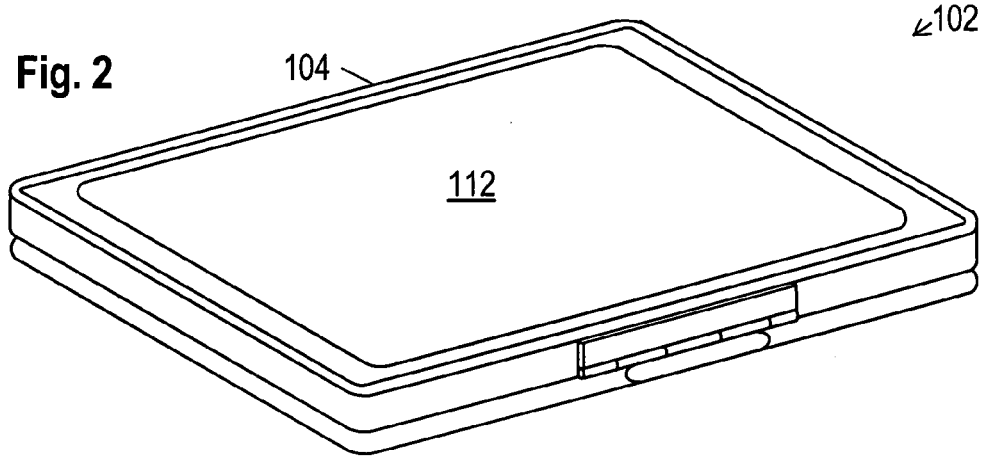
FIG. 2 shows the illustrative tablet computer in a tablet configuration.

However, the tablet computer has another configuration. Monitor 104 can be turned on pivot 108 and tilted flat on hinge 110. Moving the monitor 104 in this manner places the computer in a tablet configuration as shown in FIG. 2. In the tablet configuration, a user interacts with the computer via a touch-sensitive screen 112. The touch-sensitive screen provides visual representations of actions and options that may be selected by the user. The user may select the actions or options by touching the screen where the representations are displayed. (Depending on the implementation, the user may employ a stylus, a generic pointed object, or even a finger.) In some embodiments, the user may enter text or shapes simply by drawing them on the touch-sensitive screen.

Figure 3:
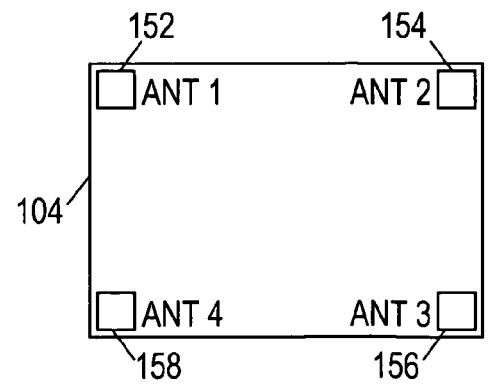
FIG. 3 shows an illustrative antenna configuration in accordance with certain embodiments.

FIG. 3 shows an illustrative portable computing device antenna configuration in accordance with some embodiments of the invention. Four antennas 152, 154, 156, and 158 are distributed in the four corners of monitor 104, or more generally, distributed near each corner of a substantially rectangular surface having a display screen. In practice, a larger or smaller number of antennas may be employed. Depending on the computing device's orientation, some antennas are expected to encounter better reception than others. Alternatively, in different orientations, different combinations of the antennas may provide a desired directional sensitivity.

Accordingly, the portable computing device may be configured to automatically select some subset of antennas for wireless communications based on the computing device's configuration. For example, when computer 102 is deployed in the keyboard configuration as shown in FIG. 1, the computer automatically selects antennas along the uppermost surface for wireless communications. Thus corner antennas 152 and 154 (FIG. 3) may be selected in this configuration. Conversely, when computer 102 is deployed in the tablet configuration as shown in FIG. 2, the computer automatically selects antennas along the edge most distal from the user. Thus, if the computer screen 112 is operating in a portrait orientation, antennas 154 and 156 may be selected for wireless communication. Alternatively, antennas 158 and 152 may be selected if the screen 112 is placed in an inverted portrait orientation; antennas 152 and 154 may be selected if the screen is placed in a landscape orientation; and antennas 156 and 158 may be selected if the screen is placed in an inverted landscape orientation.

The antenna subsets selected in the foregoing example are selected based on the predicted usage orientation for each of the portable computer's configurations. This approach provides a fast, low-complexity method to estimate the best antenna subset for wireless communications. The use of an antenna subset advantageously enables a simpler transceiver design, and reduces "antenna hopping" in fast-changing communications environments.

Figure 4:
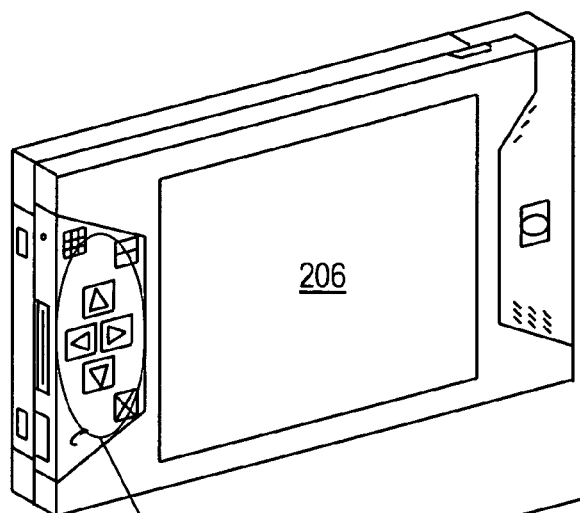
FIG. 4 shows an illustrative handheld computer in a left-hand landscape orientation.
Figure 5:
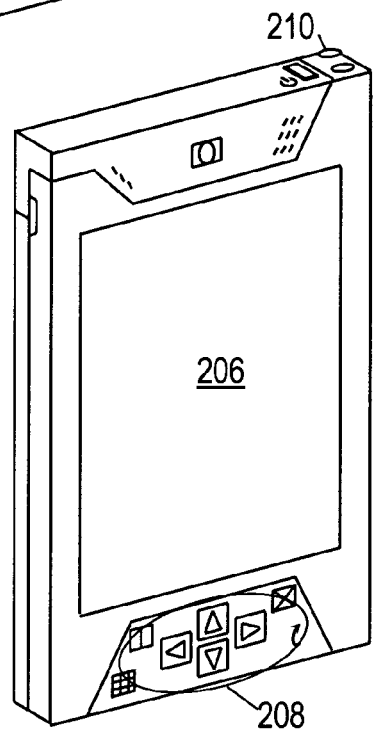
FIG. 5 shows the illustrative handheld computer in a portrait orientation.
Figure 6:
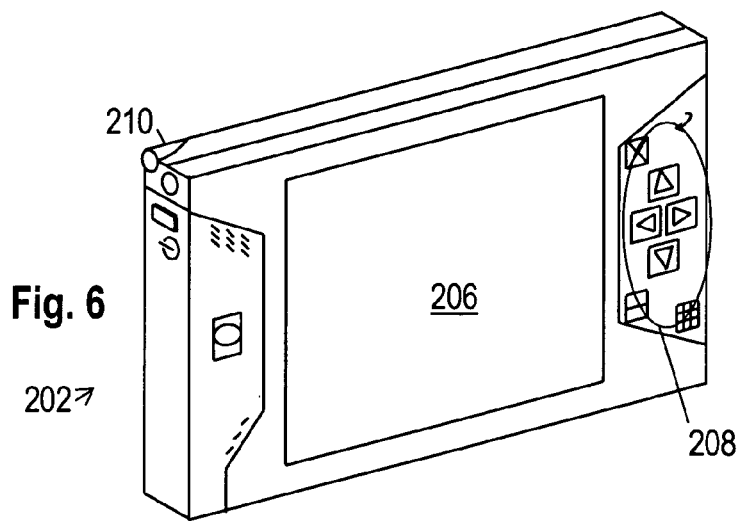
FIG. 6 shows the illustrative handheld computer in a right-hand landscape orientation.

Handheld devices suffer from related difficulties. FIGS. 4-6 illustrate a handheld device 202 in three respective orientations: left-hand landscape (FIG. 4), portrait (FIG. 5), and right-hand landscape (FIG. 6). The handheld device 202 may also be operable in a fourth, "inverted portrait," orientation.

Device 202 features a display screen 206 configured to provide a graphical user interface that can be displayed in portrait and landscape modes. The user may interact with device 202 by viewing options on screen 206 and selecting one or more of the viewed options with controls 208 or by touching the desired option on a touch-sensitive display screen 206. A stylus 210 may be provided with device 202 for making selections or directly entering information on a touch-sensitive area of device 202. The options provided by display 206 may represent actions to be taken by device 202. For example, device 202 may display icons representing software to be executed, files to be opened, or information to be captured. Controls 208 may be programmably associated with various actions to be taken by device 202 when the control is depressed. Such actions may be highlighting different options to be selected, executing specific software, or establishing remote connections to a network or to another device.

Many handheld devices employ the 2400-2483.5 MHz Industrial, Scientific, and Medicine (ISM) frequency band. This frequency range comprises resonance frequencies of the water molecule, and hence, this frequency range is commonly employed by microwave ovens. With so many sources of interference, the FCC dedicated this frequency band for unlicensed use, making the ISM band a popular choice for makers of handheld devices. Unfortunately, the human body comprises a large fraction of water, making a user's hands a significant cause of attenuation. Thus a user, in holding a handheld device, may be covering one or more antennas, making these antennas less suitable for wireless communications.

For example, when handheld device 202 is employed in a left-hand landscape position (FIG. 4), antennas 156 and 158 (FIG. 3) may be covered by a user's hands. Similarly, when device 202 is employed in a portrait orientation (FIG. 5), antennas 152 and 158 (FIG. 3) may be covered. When device 202 is employed in a right-hand landscape orientation, antennas 152 and 154 may be convered, and when device 202 is employed in an inverted portrait position, antennas 154 and 156 may be covered.

Devices such as computer 102 and handheld device 202 are often operable in more than just one or two positions because users may find one of the additional orientations more suitable. For example, left-handed users may prefer a left-hand landscape orientation (FIG. 4) because such an orientation makes controls 208 easily accessible to the left hand, whereas right-handers may prefer the right-hand landscape orientation for easier use of the right hand. Other considerations may comprise accessibility to device ports, power, and infrared communications.

Figure 7:
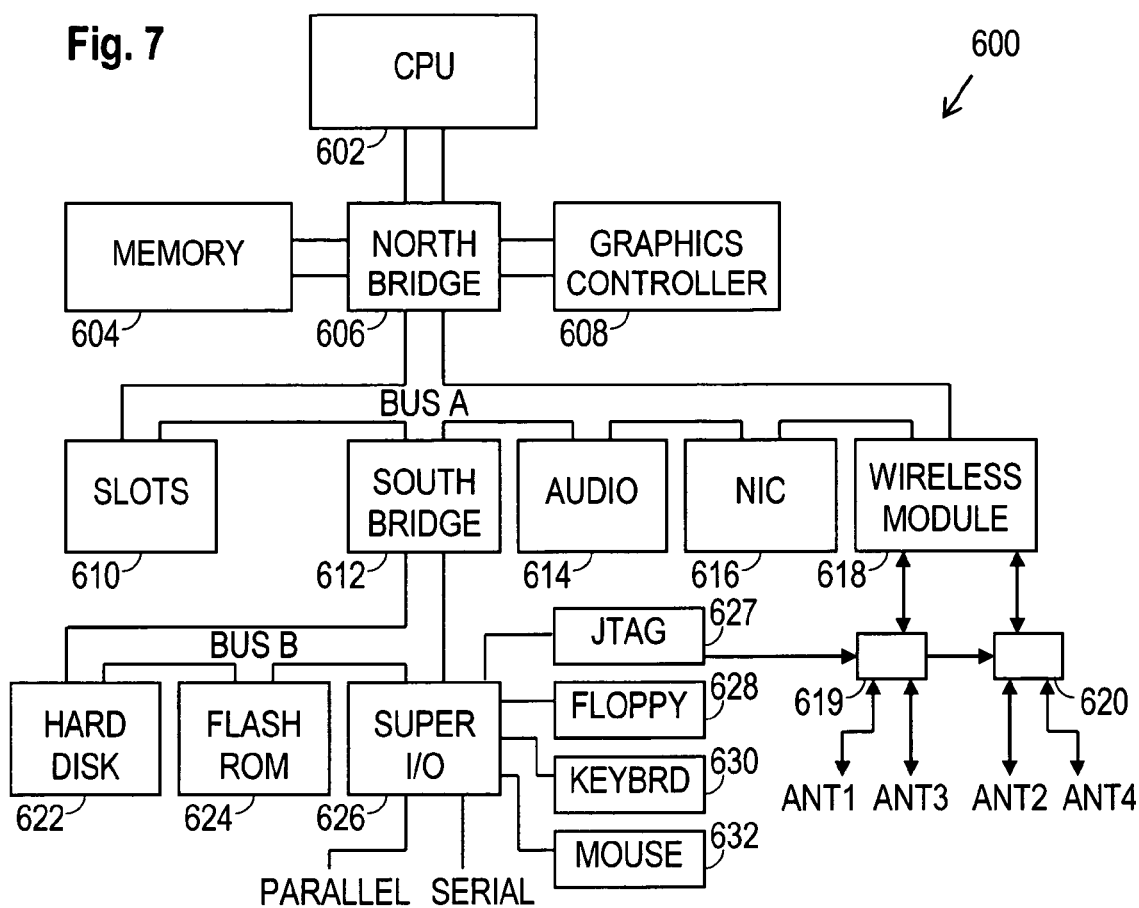
FIG. 7 is a block diagram of an illustrative computer in accordance with certain embodiments.

FIG. 7 shows a block diagram of an illustrative computer architecture 600. This diagram may be fairly representative of computer 102, but a simpler architecture would be expected for a handheld device. Computer architecture 600 comprises a processor (CPU) 602 coupled to a bridge logic device 606 via a CPU bus. Bridge logic device 606 is sometimes referred to as a "North bridge" for no other reason than it is often depicted at the upper end of a computer system drawing. The North bridge 606 also couples to a main memory array 604 via a memory bus, and may further couple to a graphics controller 608 via an accelerated graphics port (AGP) bus. The North bridge 606 couples CPU 602, memory 604, and graphics controller 608 to the other peripheral devices in the system through a primary expansion bus (BUS A) such as a PCI bus or an EISA bus. Various components that comply with the bus protocol of BUS A may reside on this bus, such as an audio device 614, a network interface card (NIC) 616, and a wireless communications module 618. These components may be integrated onto the motherboard, as shown, or they may be plugged into expansion slots 610 that are connected to BUS A. As technology evolves and higher-performance systems are increasingly sought, there is a greater tendency to integrate many of the devices into the motherboard which were previously separate plug-in components.

If other secondary expansion buses are provided in the computer, as is typically the case, another bridge logic device 612 is used to couple the primary expansion bus (BUS A) to the secondary expansion bus (BUS B). This bridge logic 612 is sometimes referred to as a "South bridge" reflecting its location relative to the North bridge 606 in a typical computer system drawing. Various components that comply with the bus protocol of BUS B may reside on this bus, such as hard disk controller 622, Flash ROM 624, and Super I/O controller 626.

The Super I/O controller 626 typically interfaces to basic input/output devices such as a keyboard 630, a mouse 632, a floppy disk drive 628, a parallel port, a serial port, and a JTAG interface. JTAG stands for Joint Test Action Group, and it is an IEEE standard for testing and configuration of integrated components.

Wireless communications module 618 has two antenna ports. The two antenna ports are coupled to four antennas via switches 619 and 620. Switch 619 couples a selectable one of antennas ANT1 and ANT3 to the first antenna port of module 618. These antennas may be on diagonally opposite corners of a portable computer as shown in FIG. 3. Similarly, switch 620 couples a selectable one of antennas ANT2 and ANT4 to the second antenna port of module 619. These antennas may also be on diagonally opposite corners as shown in FIG. 3. This configuration enables the two antenna ports to be coupled to adjacent antennas on any edge of computer 102.

An information carrier medium makes software available for execution by processor 602. Examples of information carrier media include floppy disks, optical disks, portable hard disks, nonvolatile integrated circuit memory, computer networks, and wireless links. Processor 602 stores the software in memory 604 as it executes the software. The software in memory 604 configures the processor 602 to monitor the computer's usage mode and to adjust the selected antenna subset to correspond with the computer's configuration and/or orientation. In the illustrated embodiment, processor 602 adjusts the antenna subset selection by accessing registers in JTAG interface 627. Via these registers, the processor 602 configures various digitally-controlled switches comprising switches 619 and 620. In this manner, processor 602 adjusts the hardware configuration of computer 600, and in particular, selects the antennas to be coupled to wireless module 618. When appropriately configured by processor 602, the wireless module 618 establishes and maintains a wireless communications link using the one or more antennas to which it is coupled.

Figure 8:
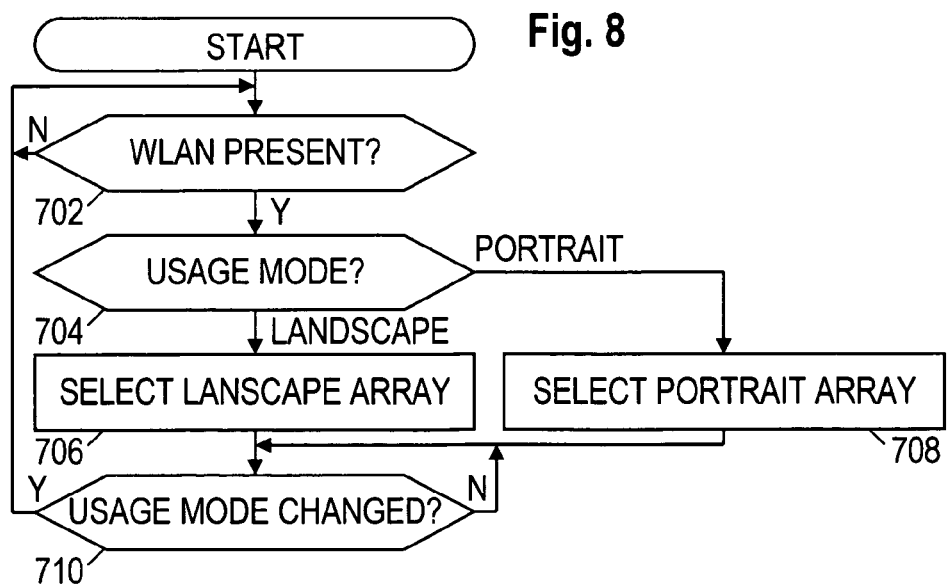
FIG. 8 is a flow diagram of an illustrative antenna selection method in accordance with certain embodiments.

FIG. 8 is a flow diagram of an illustrative antenna selection method. This method may take the form of a software routine executed by a general purpose processor, or alternatively may take the form of special-purpose hardware. In its software embodiment, the process may be stored on a magnetic or optical disk, or may be made available to the computer via a network of communications links between computers. (The term "information carrier medium" is used herein to refer to an information source from which a computer may obtain software to be executed. Examples include hard disk drives, floppy disks, compact disks, digital video discs ("DVDs"), the Internet, Ethernet links, and wireless links.) The computer may obtain the method software from an information carrier medium and store all or part of the software in memory 604 for ready access.

The illustrative selection method embodiment begins with a monitoring state 702 that monitors whether a wireless network is available for establishing a wireless communications link. The monitoring may be performed on any antenna, and may comprise listening for a beacon frame or other broadcast indication of the presence of a wireless local area network (WLAN). Alternatively, the monitoring may be user-oriented, in that the monitoring may be of a user-configurable parameter. When the parameter is set to indicate no wireless communication is desired, the device does not attempt to detect a WLAN or to establish a wireless connection. However, when the parameter is set to indicate that a wireless connection is desired, the device proceeds to block 704.

At block 704, the device performs a test to determine the usage mode. In the illustrated embodiment, the usage mode is determined by screen orientation to be either landscape or portrait. However, other usage modes may exist and may be determined based on screen orientation and/or additional parameters. For example, the device may have a deployable keyboard, and the usage mode determination may be based in part on whether the keyboard is deployed, i.e., one usage mode may correspond to a device configuration with an extended keyboard, while another usage mode may correspond to a device configuration with a stowed keyboard. In the same vein, the device may have a stylus or other pointing device, and the usage mode may be based in part on whether the stylus or other pointing device is in use. A user's left- or right-handedness may be provided to the device and used as one parameter in determining the usage mode. A number of usage mode sets are provided below as examples:

{landscape, portrait}
{landscape, inverted landscape, portrait, inverted portrait}
{tablet mode, keyboard mode}
{clipboard mode, lap mode, desk mode, wall-mount mode}
{left-hand landscape, portrait, right-hand landscape}
{docked, un-docked}

In the illustrated embodiment, the device proceeds to block 706 if the usage mode is landscape, and proceeds to block 708 if the usage mode is portrait. At block 706, the device selects the antenna subset for the landscape mode. The landscape mode antenna subset may comprise antennas that are expected to be near the upper edge of the device when the display is configured for a landscape orientation. At block 708, the device selects the antenna subset for the portrait mode. The portrait mode antenna subset may similarly be the antennas that are expected to be near the upper edge of the device when the display is configured for a portrait orientation.

From blocks 706 and 708, the device enters block 710. Block 710 represents a monitoring state where the process remains until a change in usage mode is detected. The detection may involve a determination that the screen orientation has been changed, that the keyboard has been deployed or retracted, that the pointing device has moved, that a user-controlled parameter has changed, or some other indication of a change in usage mode has occurred.

What is claimed is:

1. A method of configuring a device, the method comprising:
   determining a usage mode of the device; and
   selecting a subset of a plurality of antennas provided near each corner of a substantially rectangular surface of a display screen, the subset corresponding to a particular antenna diversity configuration for the usage mode.

2. The method of claim 1, wherein determining the usage mode comprises identifying a mode in a usage mode set, the set comprising at least one usage mode for each orientation of a display.

3. The method of claim 2, wherein the subset for each usage mode comprises those antennas expected to be near an edge of the substantially rectangular surface most distal from a user when the display screen is used having the orientation for that usage mode.

4. The method of claim 2, wherein the subset for each usage mode comprises those antennas expected to be near an uppermost edge of the substantially rectangular surface when the display screen is used having the orientation for that usage mode.

5. The method of claim 1, wherein determining the usage mode comprises sensing whether a keyboard is deployed, and if so, identifying a usage mode corresponding to a device configuration with an extended keyboard.

6. The method of claim 1, further comprising selecting another subset of the plurality of antennas when the usage mode changes.

7. A portable computing device that comprises:
a plurality of antennas that provide different antenna diversity configurations;
a wireless module;
at least one switch that selectively couples a subset of the plurality of antennas to the wireless module, wherein the at least one switch is set to select one of the antenna diversity configurations in accordance with a usage mode of the device; and
a substantially rectangular surface having a display screen, wherein the plurality of antennas comprises an antenna near each corner of the substantially rectangular surface.

8. The device of claim 7, further comprising a processor configured to determine the usage mode of the device and further configured to accordingly set the at least one switch.

9. The device of claim 7, wherein the usage mode is determined at least in part by an orientation of the display screen.

10. The device of claim 7, further comprising a deployable keyboard, wherein the usage mode is determined at least in part on whether the keyboard is deployed.

11. The device of claim 7, wherein the at least one switch comprises a first switch that couples two of said corner antennas to the wireless module, and wherein the device further comprises a second switch that couples another two of said corner antennas to the wireless module.

12. The device of claim 7, wherein the corner antennas coupled to the wireless module by the first switch are near diagonally opposite corners of the substantially rectangular surface.

13. A non-transitory, computer-readable medium for providing software to a portable computing device, wherein the software configures the portable computing device to:
couple a subset of multiple antennas provided near each corner of a substantially rectangular surface of a display screen to a wireless communications module when the device is configured for a first usage mode; and
couple a different subset of the multiple antennas to the wireless communications module when the device is configured for a second, different usage mode.

14. The non-transitory, medium of claim 13, wherein the first and second usage modes are from a set of usage modes corresponding to orientations of a display screen.

15. The non-transitory, medium of claim 13, wherein the first and second usage modes are from a set of usage modes that correspond to deployment states of a keyboard.

16. The non-transitory, medium of claim 13, wherein the subsets coupled to the wireless communications module comprise those antennas expected to be most distal from a user when the device is configured in the corresponding usage mode.

17. The non-transitory, medium of claim 13, wherein the subsets coupled to the wireless communications module comprise those antennas expected to be most elevated when the device is configured in the corresponding usage mode.

18. A portable computing apparatus that comprises:
a plurality of antenna diversity means for coupling the apparatus to a wireless link;
a communication means for generating and receiving wireless communication signals;
a switching means for coupling a subset of the plurality of antenna diversity means to the communication means, said switching means operating in accordance with a usage mode of the portable computing apparatus; and
a substantially rectangular surface having a display screen, wherein the plurality of antenna diversity means comprises a means for receiving and transmitting near each corner of the substantially rectangular surface.

19. The apparatus of claim 18, further comprising:
a processing means for determining the usage mode and responsively configuring the switching means.

* * * * *